United States Patent [19]

Maher et al.

[11] 3,798,918

[45] Mar. 26, 1974

[54] METHOD AND APPARATUS FOR PURIFYING NATURAL GAS TO BE LIQUEFIED AND STORED

[75] Inventors: James Bernard Maher, Oak Brook; Terry Wayne Delahunty, La Grange Park, both of Ill.

[73] Assignee: Chicago Bridge & Iron Company, Oak Brook, Ill.

[22] Filed: Apr. 15, 1971

[21] Appl. No.: 134,373

[52] U.S. Cl.............................. 62/40, 62/12, 62/54, 62/58
[51] Int. Cl............................. F25j 3/00, F25j 3/08
[58] Field of Search............ 62/9, 11, 12, 20, 23, 44, 62/51, 54, 58, 23, 24, 13, 14, 40

[56] References Cited
UNITED STATES PATENTS

| | | | |
|---|---|---|---|
| 2,824,428 | 2/1958 | Yendall | 62/14 |
| 2,873,583 | 2/1959 | Potts | 62/14 |
| 3,109,726 | 11/1963 | Karwat | 62/13 |
| 2,090,163 | 8/1937 | Twomey | 62/14 |
| 3,413,817 | 12/1968 | Kniel | 62/23 |
| 3,303,660 | 2/1967 | Berg | 62/51 |
| 3,271,965 | 9/1966 | Maher | 62/54 |

*Primary Examiner*—Norman Yudkoff
*Assistant Examiner*—Arthur F. Purcell
*Attorney, Agent, or Firm*—Merriam, Marshall, Shapiro & Klose

[57] ABSTRACT

Water, carbon dioxide, hydrogen sulfide or mercaptans present as impurities in admixture with methane vapor are removed by feeding the impure methane vapor into liquefied methane in an enclosed space thereby solidifying such impurities in the liquefied methane and withdrawing from the closed space methane vapor having reduced amounts of such impurities.

Water and carbon dioxide, present as impurities in compressed air, are removed by feeding the impure compressed air into liquefied air in an enclosed space thereby solidifying such impurities in the liquefied air and withdrawing from the closed space compressed air having reduced amounts of such impurities.

Apparatus for purifying and liquefying a gas in admixture with impurities having an insulated storage tank, a purification tank inside of and communicating internally with the inside of the insulated storage tank, a conduit extending into the purification tank to below a predetermined level of liquefied gas to be held therein for supplying impure gas vapor thereto, a conduit extending from the bottom of the purification tank through the insulated storage tank for removing solids therefrom, a conduit communicating with a vapor space in the storage tank and a refrigeration system, a liquefied gas conduit communicating with the refrigeration system and the storage tank interior, and a conduit communicating with the lower interior of the storage tank for withdrawing liquefied gas therefrom.

2 Claims, 4 Drawing Figures

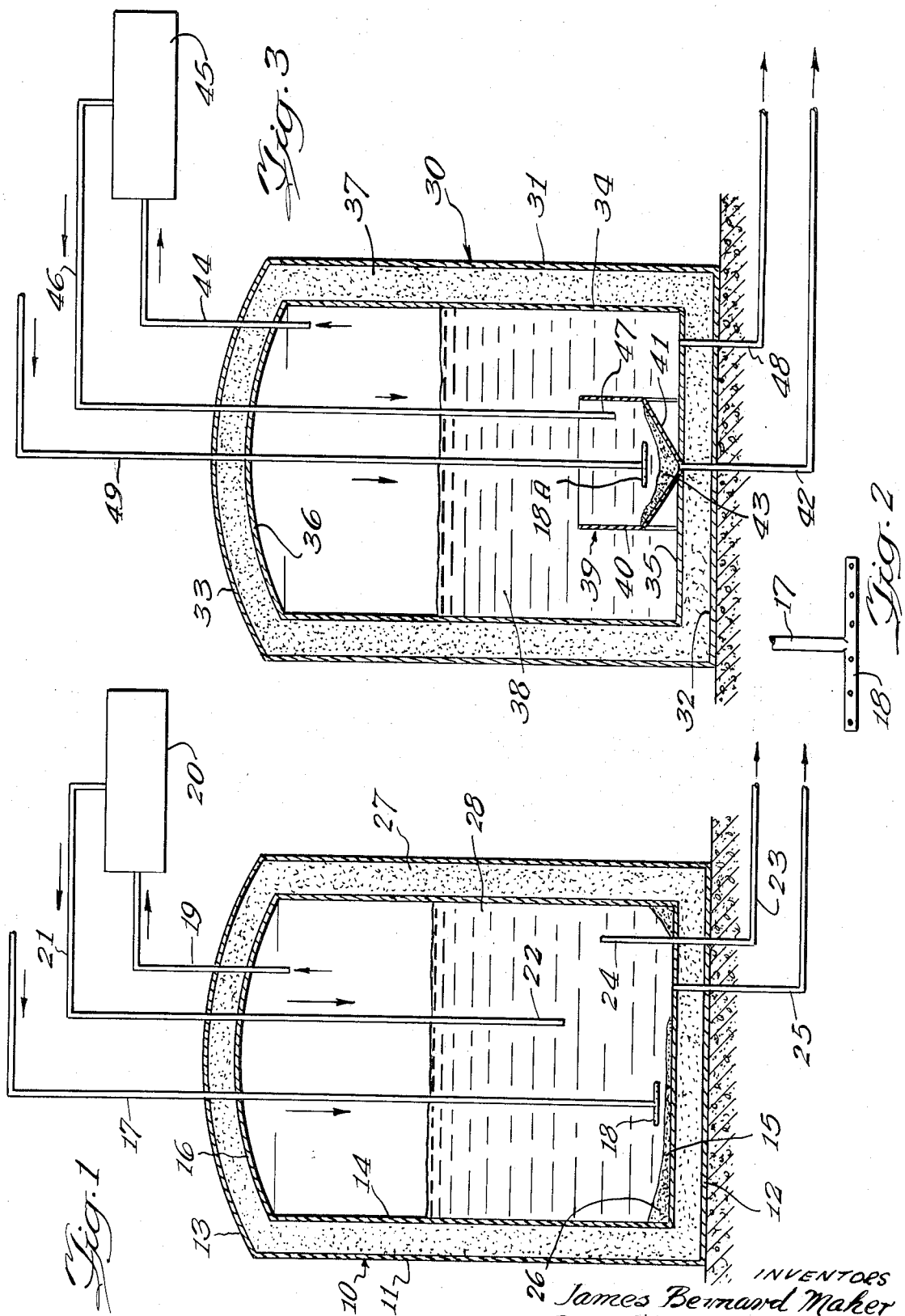

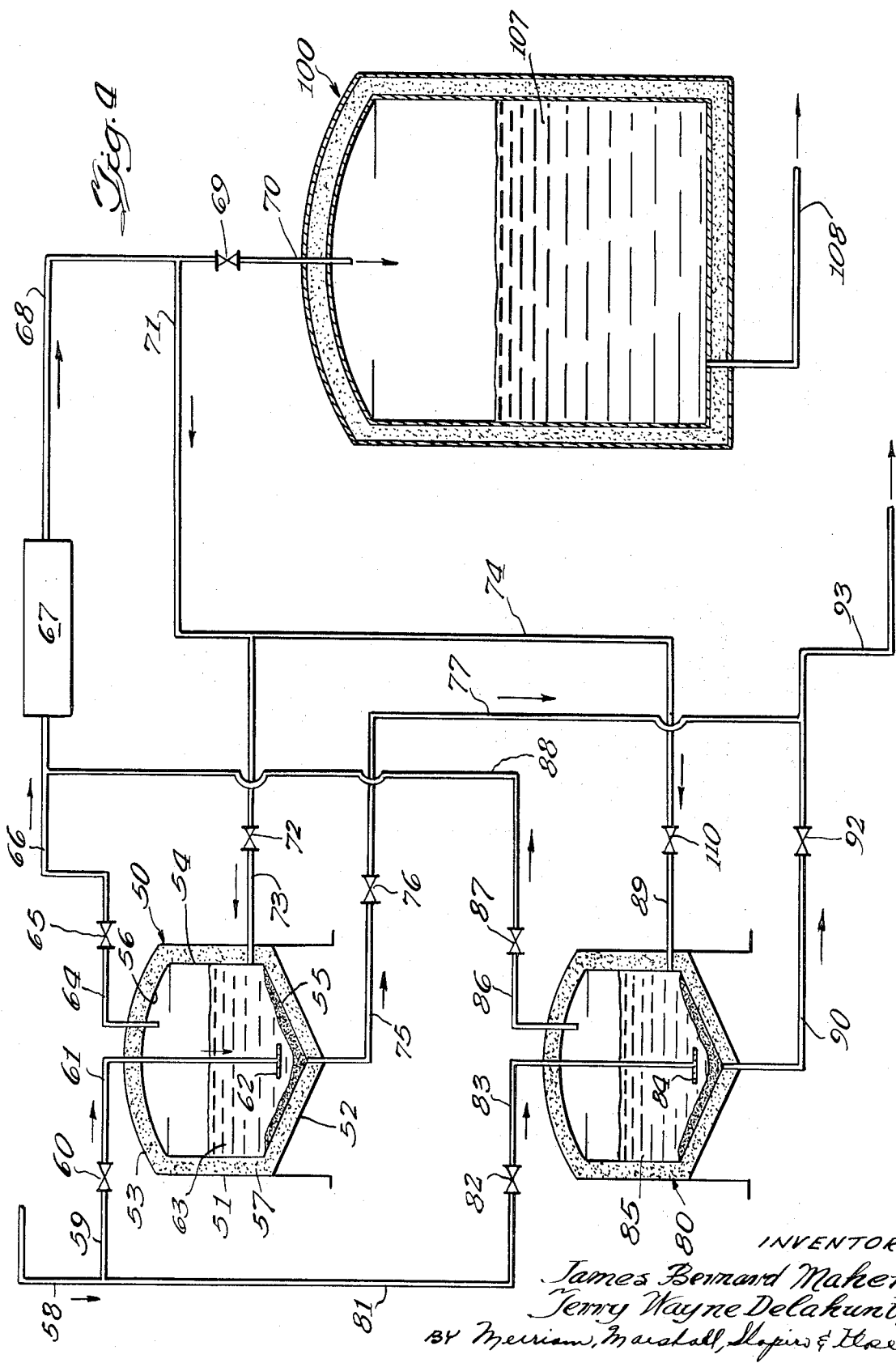

METHOD AND APPARATUS FOR PURIFYING NATURAL GAS TO BE LIQUEFIED AND STORED

This invention relates to the purification of gases. More particularly, this invention is concerned with the purification of methane containing various gaseous impurities such as are present in natural gas, and the purification of compressed air containing undesirable components or contaminants.

Methane is widely used industrially and by consumers as a source of heat. For most such uses it must be reasonably pure or low in various undesirable contaminants or impurities such as water vapor, carbon dioxide and sulphur-containing gases including hydrogen sulfide and various mercaptans such as methyl mercaptan and ethyl mercaptan. Methane must be reasonably pure, not only because of the end uses to which it is put, but because in some instances the methane is liquefied for storage. Unless the impurities are removed from the gas before it is cooled by refrigeration to temperatures and pressures which permit liquefaction of the methane at about −260°F. and just slightly above atmospheric pressure, the impurities will coat out on the refrigeration equipment and lower its efficiency or plug the tubes and pipes used therein.

Since the described contaminants are generally present in natural gas, which is the main source of methane at the present, a number of means have been developed and are used to remove or lower the amount of one or more or all of such impurities in the natural gas. The systems most extensively used are believed to be those which employ molecular sieves or solvent extraction techniques. These systems are costly to construct, operate and maintain because of the large amount of natural gas which must be purified. There is thus a need for an alternative system to purify methane which is economical to construct, efficient in operation and relatively simple to maintain.

Not only is it desirable to remove contaminants and impurities from methane, but also from compressed air. For many purposes, compressed air should be free of, or low in, carbon dioxide and water vapor.

According to one aspect of the invention, there is provided by the present invention a method of, and apparatus for, lowering the amount of water, carbon dioxide, hydrogen sulfide and mercaptans in admixture with methane vapor which comprises feeding the impure methane vapor into liquefied methane in an enclosed space thereby solidifying such impurities in the liquefied methane and withdrawing from the closed space methane vapor having reduced amounts of such impurities. The temperature of the liquefied methane is below the freezing point of the impurities, except of nitrogen, so that the impurities freeze quickly into small, solid particles which are more dense than the liquefied methane. By withdrawing methane vapor from above the liquefied methane, purified methane is obtained which is very low in, or substantially free of, impurities. The purified methane vapor can be cooled by suitable refrigeration means without causing significant coating or plugging of heat exchanger surfaces and pipes and liquefied for storage in a suitable tank. The tank can be the same as, or different than, the enclosed space holding the liquefied methane in which the impurities are solidified.

According to another aspect of the invention, compressed air is purified by injecting it into liquefied air. The low temperature of the liquefied air causes carbon dioxide and water vapor to solidify and remain in the liquefied air. Purified compressed air is removed from above the liquefied air.

The invention will now be described further, with regard to the purification of methane, in conjunction with the attached drawings in which:

FIG. 1 is a schematic drawing of apparatus in which the same tank is used for purifying a gas such as natural gas and storing the same gas therein after liquefaction;

FIG. 2 is an enlarged view of a sparger at the end of the feed gas conduit of FIG. 1;

FIG. 3 is a schematic drawing of apparatus in which the storage tank has an internal gas purification tank which collects solid impurities; and FIG. 4 is a schematic drawing of apparatus in which two external gas purification tanks are used in parallel and the purified gas is fed therefrom through a liquefaction or refrigeration system, liquefied and fed to an insulated storage tank.

As shown in FIG. 1, liquefied gas storage tank 10 has an outer shell comprising a vertical cylindrical wall 11, a bottom 12 and a domed roof 13. The storage tank also has an inner shell composed of vertical cylindrical wall 14, bottom 15 and domed internal roof 16. Insulation material 27 is positioned between the inner and outer shells to retard heat leak from the atmosphere into the insulated storage tank.

A gas stream to be purified is fed by conduit 17 to the internal bottom space of storage tank 10. The lower end of conduit 17 inside of the tank is advisably provided with a sparger 18 to facilitate dispersion of the gas feed stream in the liquefied gas 28 in the tank. While the liquefied gas 28 can be any one of a number of gases, for purposes of illustration it will be considered as being liquefied methane derived from natural gas and that the feed stream is impure natural gas. The stream of impure natural gas which exits from sparger 18 is dispersed throughout the liquefied methane 28 and the impurities in the natural gas are rapidly cooled to below their solidification points and are thereby converted into solid materials in the form of small particles. The solidified impurities are more dense than the liquefied gas and, therefore, settle to the bottom of the tank. The gas exiting from sparger 18 serves to prevent the solidified impurities from forming as an immobile cake or deposit on the bottom of the tank. Although a mass of solids 26 can settle on the bottom of the tank, the agitation achieved by the sparger prevents serious caking.

Purified vapors are removed from the upper interior vapor space of storage tank 10 by conduit 19 and are fed thereby to refrigeration system 20 which liquefies the vapors. The liquefied gas is then conveyed from the refrigeration system by conduit 21 to the interior of storage tank 10. The liquefied gas is advisably fed into the liquid in tank 10 with the lower end 22 of conduit 21 below the desired minimum liquid level for which the tank is designed.

By means of conduit 25 which communicates with the bottom interior of storage tank 10, a mixture of solidified impurities and liquefied gas is removed therefrom. This mixture may be disposed of in any manner considered advisable. In the case of liquefied methane, the mixture may be revaporized and fed into a consumer gasline. It may be used also to control the BTU value of gas vapor formed by the subsequent vaporization of liquefied methane removed from the storage tank. The impurities such as carbon dioxide and water, having no heating value, will lower the heating value of the vaporized gas. Conduit 23 can be used to withdraw liquefied gas from the storage tank. The internal end 24 of conduit 23 is positioned sufficiently high above the internal bottom 15 of the storage tank so as to be above the mass of solidified solids 26 which accumulates therein and at a level at which significant amounts of suspended solidified impurities are dispersed therein. The liquefied gas so withdrawn can be vaporized if desired.

The system as described in conjunction with FIG. 1 can be used for the purification of natural gas. A typical natural gas feed might have the following volumetric analysis: methane, 94.452%; ethane, 3.2%; propane, 0.535%; normal and iso-butanes, 0.195%; normal and iso-butanes, 0.051%; nitrogen, 0.626%; carbon dioxide, 0.821%; and water vapor, 0.12%. After such a feed gas at ambient temperature is fed into liquefied natural gas 28 at about −260°F. and slightly above atmospheric pressure, the vapor removed from the storage tank for cooling and liquefaction can be expected to have the following typical analysis: methane, 99.33%; ethane, 0.01%; and nitrogen, 0.66%. The natural gas is accordingly purified in the described manner to purity at which it can be fed to a liquefaction system without any or minimal problems resulting from plugging or coating of the conduits, pipes and heat exchangers since the level of impurities after such a purification is so low that insufficient amounts are present in the purified gas to present a problem. Furthermore, the stream of gas fed by conduit 17 into liquefied gas 28 need not be precooled. It can be fed directly at ambient temperature into the liquefied gas.

Instead of removing the solidified impurities by means of conduit 25, it is within the scope of the invention to remove storage tank 10 from operation and to vaporize the entire contents thereof, including the liquefied gas and the solidified impurities, by permitting the tank to warm-up. In this way, all the impurities can be removed and the tank thereafter returned to service.

The system illustrated by FIG. 3 is in most respects similar to that shown in FIG. 1. However, the apparatus of FIG. 3 has an internal purification tank set in the lower part of the storage tank to thereby restrict the solid impurities to a smaller space from which they can be more readily removed. As shown in FIG. 3, insulated storage tank 30 has external and internal shells. The external shell has a cylindrical vertical wall 31, a flat bottom 32 and a domed roof 33. The internal shell has a vertical cylindrical wall 34, a bottom 35 and a domed roof 36. Insulation is placed between the internal and external shells to retard heat leak.

An internal purification tank 39 is located in the bottom space of storage tank 30. Purification tank 39 has a vertical cylindrical wall 40 and a conical bottom 41, the slope of which directs solidified impurities 43 to conduit 42 for removing them therefrom. Conduit 49 feeds a stream of gas to be purified into purification tank 39. The gas to be purified sprays from sparger 18A, which is like sparger 18 in FIG. 2, into liquefied gas in purification tank 39. The gas is rapidly cooled after it streams from sparger 18A and the impurities therein are solidified into small particles which settle to the bottom of purification tank 39. Purified gas vapors are removed from the upper part of storage tank 30 by conduit 44, which communicates therewith, and are fed to refrigeration system 45 from which liquefied gas is fed by conduit 46 into storage tank 30. The liquefied gas is advisably fed into liquefied gas 38 in the tank by placing the lower end 47 of conduit 46 into communication with purification tank 39. Liquefied gas can be removed from storage tank 30 by conduit 48 which communicates with the internal bottom portion thereof.

While purification tank 39 is shown without a top or cover in FIG. 3, it is within the contemplation of the invention to use a purification tank which is wholly or partly closed at the top and provided with suitable side or top openings for the liquefied gas to flow back and forth and for purified vapor to flow out therefrom into the mass of liquefied gas 38.

The system of FIG. 4 also employs a purification tank but the purification tank of the embodiment of this figure of the drawings is placed outside of the storage tank and, in addition, two purification tanks are used in parallel with one being in service and the other out of service during operation of the system.

Purification tank 50 is a double shelled tank. The external shell has a vertical cylindrical wall 51, a conical bottom 52 and a domed roof 53. The internal shell has a vertical cylindrical wall 54, a conical bottom 55 and a domed roof 56. Insulation 57 is placed between the shells to retard heat leak. A twin purification tank 80 is similarly constructed and therefore will not be described in further detail except later in regard to the conduits which communicate with it.

Natural gas to be purified is fed by conduit 58 through conduit 59 and valve 60 into conduit 61 which communicates with sparger 62 placed inside the bottom space of purification tank 50. Sparger 62 is located below liquefied methane 63 in the purification tank. As the impure natural gas streams from sparger 62, impurities are cooled and solidified and settle to the bottom of the tank from which they are withdrawn after settling by means of conduit 75, valve 76, conduit 77 and conduits 93, with valve 92 closed.

Purified natural gas vapors accumulate in the upper part of purification tank 50 and are removed by conduit 64, which communicates therewith, and are fed through valve 65 to conduit 66 and then to refrigeration system 67 which cools and liquefies the gas. The liquefied gas is conveyed from the refrigeration system 67 by conduit 68 through valve 69 and into storage tank 100. Storage tank 100 is of similar construction to storage tanks 10 and 30 previously described. However, many other types of storage tanks can be used and the type employed is considered a matter only of economics, safety and preference.

Conduit 71 communicates with conduit 68 and can be used to remove some of the liquefied methane from conduit 68 and feed it through valve 72 to conduit 73 and by such conduit into purification tank 50 to thereby supply and replenish the liquefied gas used for effecting the desired purification of the feed stream by solidifying the impurities therein. Of course, the liquefied methane delivered by conduit 73 to purification tank 50 can be obtained instead from storage tank 100.

After purification tank 50 has been in service for some time, it can be taken out of service in order for the solids which accumulate therein to settle and be removed.

During the time that purification tank 50 is out of service, the feed stream can be sent by conduit 58 through conduit 81 and valve 82 to conduit 83 for delivery out of sparger 84 in the second purification tank 80. When this is done, valve 60 is closed. The gas stream exiting from sparger 84 is rapidly cooled and impurities in the gas are solidified in the liquefied methane 85. Purified methane vapors are removed from purification tank 80 by conduit 86, passed through valve 87 to conduit 88 and delivered by it to conduit 66 which delivers the vapors to refrigeration system 67. The vapors are then cooled, liquefied and delivered by conduit 68 through valve 69 and conduit 70 to storage tank 100. To supply liquefied methane to purification tank 80 for removing impurities by solidifying the same therein some of the liquefied methane from conduit 68 can be diverted to conduit 71 and from it to conduit 74, through valve 110 to conduit 89 and from it into purification tank 80. Of course while this is done, valve 72 is closed as is valve 92.

After purification tank 80 has been in service for a predetermined time, valves 82 and 87 are closed and valve 92 is opened to remove solidified solids and some of the liquefied gas from the tank by means of conduit 90 which delivers the material through valve 92 to conduit 93 for disposing in a suitable manner. During the time that purification tank 80 is out of service and is not used to purify the feed gas stream, the alternate purification tank 50 is on stream and the feed gas is directed to it by means of conduits 58 and 59, through valve 60 and into tank 50 by means of conduit 61 and sparger 62.

The liquefied gas 107 in storage tank 100 can be removed therefrom by conduit 108 which communicates with the internal bottom space of the tank.

It is to be understood that the storage tanks are equipped with such ancillary equipment as is appropriate for storage of a liquefied gas therein. For example, a conduit can be provided to remove vapor from the storage tank which forms by heat leak through the tank. Such vapor can be sent to a distribution line or it can be reliquefied and returned to the storage tank.

The systems, methods and apparatus already described can be employed to purify compressed air containing impurities, which solidify in liquefied air, by replacing the liquefied natural gas or liquefied methane with liquefied air in the enclosed space and feeding compressed air into it. The carbon dioxide and water vapor in the compressed air solidify in the liquefied air. Compressed air is removed from the enclosed space having reduced amounts of such impurities. The purified compressed air, if desired, can be cooled by refrigeration, liquefied and stored in an insulated tank. The solidified impurities can be removed in solid form, admixed with liquefied air, from the enclosed space. Alternatively, the solidified impurities accumulated in the enclosed space can be removed therefrom by volatilizing them.

In most all uses of the invention herewith provided, the liquefied gas used to solidify and remove impurities from a feed stream gas advisably is the same compound which constitutes the predominant component in the feed gas. However, the liquefied gas used to remove impurities from a gas feed stream can be a different compound than the main component in the feed stream if it is acceptable to have the feed stream, following removal of the solidified impurities, diluted by vapor derived from the liquefied gas.

The foregoing detailed description has been given for clearness of understanding only, and no unnecessary limitations should be understood therefrom, as modifications will be obvious to those skilled in the art.

What is claimed is:

1. Apparatus for purifying and liquefying a gas in admixture with impurities comprising:
   an insulated storage tank;
   a purification tank with a conical bottom inside of and communicating internally with the inside of the insulated storage tank;
   a conduit extending into the purification tank, to a point below a predetermined level of liquefied gas to be held therein and above solids to be accumulated in the purification tank, for supplying impure gas vapor thereto;
   a conduit extending from the conical bottom of the purification tank through the insulated storage tank for removing solids therefrom;
   a conduit communicating with a vapor space in the storage tank and a refrigeration system;
   a liquefied gas conduit communicating with the refrigeration system and the storage tank interior; and
   a conduit communicating with the lower interior of the storage tank for withdrawing liquefied gas therefrom.

2. Apparatus for purifying and liquefying a gas in admixture with impurities comprising:
   an insulated purification tank with a conical bottom;
   a conduit extending into the purification tank, to a point below a predetermined level of liquefied gas to be held therein and above solids to be accumulated in the purification tank, for supplying an impure gas vapor thereto;
   a conduit extending from the inside conical bottom of the purification tank to the outside thereof for removing solids therefrom;
   a conduit communicating with a vapor space in the purification tank and a refrigeration system;
   a liquefied gas conduit communicating with the refrigeration system and the interior of an insulated storage tank;
   a conduit for delivering a liquefied gas to the purification tank and communicating with a source of liquefied gas in the apparatus subsequent to the refrigeration system; and
   a conduit communicating with the lower interior of the storage tank for withdrawing a liquefied gas therefrom.

* * * * *